US009537546B2

(12) United States Patent
Cordeiro et al.

(10) Patent No.: US 9,537,546 B2
(45) Date of Patent: Jan. 3, 2017

(54) IMPLEMENTING MIMO IN MMWAVE WIRELESS COMMUNICATION SYSTEMS

(75) Inventors: Carlos Cordeiro, Portland, OR (US); Guoqing Li, Portland, OR (US); Vallabhajosyula S. Somayazulu, Portland, OR (US); Bahareh B. Sadeghi, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 412 days.

(21) Appl. No.: 13/992,753

(22) PCT Filed: Dec. 8, 2011

(86) PCT No.: PCT/US2011/063984
§ 371 (c)(1),
(2), (4) Date: Apr. 17, 2014

(87) PCT Pub. No.: WO2013/085523
PCT Pub. Date: Jun. 13, 2013

(65) Prior Publication Data
US 2014/0294106 A1 Oct. 2, 2014

(51) Int. Cl.
*H04B 7/04* (2006.01)
*H04B 7/06* (2006.01)
(Continued)

(52) U.S. Cl.
CPC .......... *H04B 7/0413* (2013.01); *H04B 7/0452* (2013.01); *H04B 7/0617* (2013.01);
(Continued)

(58) Field of Classification Search
CPC ....... H04B 7/0413; H04B 7/0408; H04B 7/04; H04B 7/0452; H04B 7/0617; H04B 7/0691; H04L 5/0023; H04W 76/00
See application file for complete search history.

(56) References Cited

U.S. PATENT DOCUMENTS

2006/0105733 A1 5/2006 Singh et al.
2008/0144689 A1 6/2008 Crouch et al.
(Continued)

FOREIGN PATENT DOCUMENTS

| EP | 0 896 383 A2 | 2/1999 |
| WO | 2013/085523 A1 | 6/2013 |
| WO | 2013/176930 A1 | 11/2013 |

OTHER PUBLICATIONS

International Preliminary Report on Patentability and Written Opinion received for PCT Patent Application No. PCT/US2011/063984, mailed on Jun. 19, 2014, 8 pages.
(Continued)

*Primary Examiner* — Ian N Moore
*Assistant Examiner* — Latresa McCallum
(74) *Attorney, Agent, or Firm* — Ellis B Ramirez; Prass LLP

(57) ABSTRACT

A system and method are provided to increase data rates available in mmWave wireless communication systems by adapting a multiple-input multiple-output (MIMO) in a next generation mmWave wireless communication system. The system and method advantageously employ the characteristics of mmWave antenna arrays, including multiple antenna elements in each antenna array, to implement the MIMO scheme by establishing multiple beamformed communication links between a mmWave transmitter and receiver. An outgoing signal is divided into multiple signal elements to correspond to the multiple beamformed links and each of the multiple signal elements is transmitted by the transmitter across a different one of the multiple beamformed links to be reassembled at the receiver. An antenna element allocation scheme is incorporated to assign specific numbers and configurations of antenna elements at each of the transmitted (Continued)

and receiver to each of the multiple beamformed communication links.

17 Claims, 7 Drawing Sheets

(51) Int. Cl.
  *H04L 5/00* (2006.01)
  *H04W 76/00* (2009.01)
(52) U.S. Cl.
  CPC ......... *H04B 7/0691* (2013.01); *H04L 5/0023* (2013.01); *H04W 76/00* (2013.01)

(56) References Cited

U.S. PATENT DOCUMENTS

| | | |
|---|---|---|
| 2008/0254752 A1 | 10/2008 | Oh et al. |
| 2009/0160707 A1 | 6/2009 | Lakkis |
| 2009/0207822 A1* | 8/2009 | Kim .................... H04B 7/026 370/338 |
| 2010/0056062 A1* | 3/2010 | Zhang .................. H04B 7/0617 455/63.1 |
| 2010/0295730 A1 | 11/2010 | Jeon |
| 2011/0045785 A1 | 2/2011 | Sutskover et al. |
| 2011/0122932 A1 | 5/2011 | Lovberg et al. |
| 2011/0243040 A1 | 10/2011 | Khan et al. |
| 2012/0105290 A1 | 5/2012 | Brown et al. |
| 2013/0314280 A1 | 11/2013 | Maltsev et al. |

OTHER PUBLICATIONS

International Search Report and Written Opinion Received for PCT Patent Application No. PCT/US2011/063984, mailed on Jun. 28, 2012, 12 pages.

International Search Report and Written Opinion Received for PCT Patent Application No. PCT/US2013/041003, mailed on Sep. 12, 2013, 3 pages.

Wang et al., "Beam Codebook Based Beamforming Protocol for Multi-Gbps Millimeter-Wave WPAN Systems", vol. 27, No. 8, pp. 1390-1399, Oct. 2009, 6 pages.

\* cited by examiner

IMPLEMENTING MIMO IN MMWAVE WIRELESS COMMUNICATION SYSTEMS

BACKGROUND

1. Field of the Disclosed Embodiments

This disclosure relates to systems and methods for implementing a multiple-input multiple-output (MIMO) scheme in a next generation millimeter wave (mmWave) wireless communication system.

2. Related Art

The universe of wireless devices of all types running increasingly sophisticated applications has drastically increased the demand for available bandwidth to pass large amounts of data at a high data rate. This demand is expected to continue to increase. Communications in the mmWave region of the radio-frequency (RF) spectrum have emerged as providing a unique solution to the need for increased bandwidth to support high data rate wireless transmissions. Transmitting, for example, in the mmWave region of the RF spectrum offers extremely high data throughputs as a result of the ultra-wide bandwidth available. What was once considered a tradeoff for this advantage to communications in this region of the RF spectrum, i.e. that mmWave communications are highly directional with directional antenna beam forming arrays being required to sustain reasonable transmission distances based on the atmospheric absorption of the transmitted RF energy, is now considered to offer some unique opportunities for mmWave communication schemes.

Wireless communications in the mmWave range of the RF spectrum experience a high level of atmospheric RF energy absorption. Understanding that the transmitted RF energy in this frequency region would be quickly absorbed by oxygen molecules in the atmosphere over long distances, wireless technology developers focused on this characteristic as a benefit for certain applications. Previously, the high levels of atmospheric absorption and resultant range limitations were viewed as rendering mmWave technologies unsuitable for certain wireless applications. As there emerged a need for short-range high data throughput transmission paths, however, mmWave technologies emerged as a solution. An ability to provide reasonably interference free high data rate communications is now considered a significant plus for communications in the mmWave communication region of the RF spectrum.

SUMMARY OF THE DISCLOSED EMBODIMENTS

A first generation of mmWave, such as 60 GHz, wireless communication systems is in the process of being standardized as, for example, the proposed IEEE 802.11ad/WiGig standard. A broad spectrum of products that support mobile mmWave wireless communication are being developed and manufactured. Currently-planned mmWave capable devices can be equipped with one or more antennas consisting of a plurality of elements each, e.g., up to 64 elements. These "existing" mmWave wireless communication devices, and the systems within which they operate, are limited to selecting a single transmit and receive path between any two devices.

As has been shown with technologies such as the IEEE 802.11n standard, IEEE std. 802.11n-2009, published Oct. 29, 2009, and Long Term Evolution (LTE), MIMO schemes and techniques can significantly improve the performance of a wireless communication system by exploiting the channel diversity (multipaths) that different signals experience between a transmitter and a receiver.

Multiple-input and multiple-output, or MIMO, communication schemes and techniques generally refer to a class of communicating techniques that use multiple antennas at both a transmitting site and a receiving site to improve communication performance. MIMO schemes are useful in wireless communications for providing significant increases in data throughput without requiring additional bandwidth, as is recognized by the inclusion of MIMO schemes and techniques in the above wireless communication technologies and standards. MIMO schemes and techniques are characterized as providing improved spectral efficiency, signal quality and reliability, and consequently significantly enhancing data rates available for a particular wireless communication link. Existing MIMO schemes have only been applied for technologies that operate in the lower frequency bands, for example, below 6 GHz, and where transmission signals experience an omnidirectional propagation characteristic.

U.S. Pat. No. 5,345,599 to Paulraj et al., issued Sep. 6, 1994 and entitled "Increasing capacity in wireless broadcast systems using distributed transmission/directional reception (DTDR)," describes a system and a method for increasing the capacity of a wireless broadcast communication system in situations where a source signal's "high information rate exceeds the practical information carrying capacity of the available broadcast channel bandwidth." The first generation MIMO solution presented in the 599 patent explains how to effectively increase the capacity of a broadcast system by splitting the high-rate signal into several low-rate signals, and transmitting the low-rate signals from spatially separated transmitters radiating on the same frequency channel. At the receiver end, the separated signals are then demodulated and combined to obtain the original high-rate source signal.

FIG. 1 illustrates an exemplary overview of a conventional and popular implementation of a MIMO scheme 100 used in existing omnidirectional wireless communication systems. In this type of MIMO scheme 100, transmissions from a transmitter 120 and receptions at a receiver 140 are omnidirectional along an infinite number of paths 170A-X between the transmitter 120 and the receiver 140. Each transmitted signal $S1$-$S_N$ emitted separately from a transmit antenna 130A-X (as omnidirectional antennas only include a single element) is encoded differently. At the receiver 140, all the transmitted signals $S1$-$S_N$ are received from all the receive antennas 150A-X. Then, after some complex processing in the receiver 140, the transmitted signals $S1$-$S_N$ are coherently combined yielding a stronger signal and, consequently, higher performance.

While the type of MIMO scheme shown in FIG. 1 is suitable for conventional wireless communication systems that employ omnidirectional communication, in mmWave systems, as discussed briefly above, communications are predominantly directional. A beamforming protocol, such as that defined as part of the proposed IEEE 802.11ad/WiGig standard, is used to find a path between a cooperating pair of transmitter and receiver antennas. Beamforming techniques in mmWave systems are complex and require significant computing overhead to accomplish. Beamforming techniques use the presence of multiple antenna elements in the antennas at the transmit and receive sides, and manipulation of those multiple antenna elements, to shape the directional beams at each of the transmit and receive sides.

Those of skill in the art recognize that the term "beamforming" refers to a class of well-known signal processing techniques used in certain sensor arrays for manipulating directional signal transmission or reception. One technique is to combine elements in the particular sensor array in a way that signals at particular angles experience constructive interference, while other signals experience destructive interference. Beamforming, therefore, takes advantage of interference to change the directionality of the array. Beamforming can be used at both the transmit and receive sides in order to achieve spatial selectivity.

FIG. 2 illustrates an exemplary overview of a currently-planned first generation mmWave wireless communication system 200 including exemplary beamforming according to proposed first generation mmWave wireless communication standards. Based on the above-discussed complexity, the first generation mmWave communication standards and products will only support a single path 270 between a pair of a transmitter 220 and receiver 240, as individual transmitting antenna elements 230A-X and individual receiving antenna elements 250A-X are employed to produce directional beamforming at the transmitter 220 and the receiver 240 of the exemplary mmWave communication link for the same single signal S1 that is transmitted across the mmWave communication link. In addition, proposed first generation mmWave wireless communication standards use a single antenna for communication.

It is anticipated that the amount of data to be communicated wirelessly will continue to increase. Additional techniques or schemes will likely need to be found to continue to keep pace with these increases. It would be advantageous, therefore, to find some manner by which to combine the disparate mechanisms for improving available data rates in wireless communication systems that are presented by MIMO schemes and techniques, which are implemented in omnidirectional systems, such as, for example, Wi-Fi communication systems (see FIG. 1) and directional communicating technology implementation in mmWave wireless communication systems.

Given the unique characteristics of mmWave wireless communication systems, and with an understanding of how beamforming is accomplished in those systems, current MIMO schemes and techniques for use with omnidirectional communication systems are incompatible with mmWave wireless communication systems. The integration of the concept of MIMO for use in mmWave wireless communication systems dictates that systems and methods be developed that are able to adapt the concept of MIMO, and the application of MIMO schemes and techniques, to mmWave wireless communications, and the systems associated with those communications. It would, therefore, be advantageous to provide a system and a method for implementing a MIMO scheme for next generation mmWave wireless communication systems.

It would be further advantageous to develop those systems and methods with an objective of attempting to ensure that such systems and methods will not render obsolete the first generation mmWave wireless communication systems virtually at their introduction. As such, methods for signal support of MIMO schemes in next generation mmWave wireless communication systems should be developed that, to a significant extent, are backward compatible with currently-planned first generation mmWave wireless communication systems.

In implementing MIMO schemes in mmWave wireless communication systems, it may be appropriate to develop and implement a flexible and dynamic method for allocating antenna elements to the multiple beamformed links that will support the implementation of the MIMO schemes in the next generation mmWave wireless communication systems.

In various exemplary embodiments, the systems and methods according to this disclosure seek to increase data rates available in mmWave wireless communication systems.

In various exemplary embodiments, the systems and methods according to this disclosure propose a MIMO scheme to be implemented in a next generation mmWave wireless communication system.

In various exemplary embodiments, the systems and methods according to this disclosure may advantageously employ the characteristics of mmWave antenna arrays, including multiple antenna elements in each antenna array, which differ from current omnidirectional systems employing MIMO in which each antenna is composed of only a single element, to implement a MIMO scheme in a next generation mmWave wireless communication system.

In various exemplary embodiments, the systems and methods according to this disclosure propose a method of signal support for an implemented MIMO scheme in a next generation mmWave wireless communication system that is backward compatible with currently-planned first generation mmWave wireless communication systems.

In various exemplary embodiments, the systems and methods according to this disclosure propose a method for flexibly and dynamically allocating antenna elements to the multiple beamformed links for implementing a MIMO scheme in a next generation mmWave wireless communication system.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing MIMO schemes in next generation mmWave wireless communication systems will be described, in detail, with reference to the following drawings, in which.

DETAILED DESCRIPTION OF THE DISCLOSED EMBODIMENTS

Figure 1:
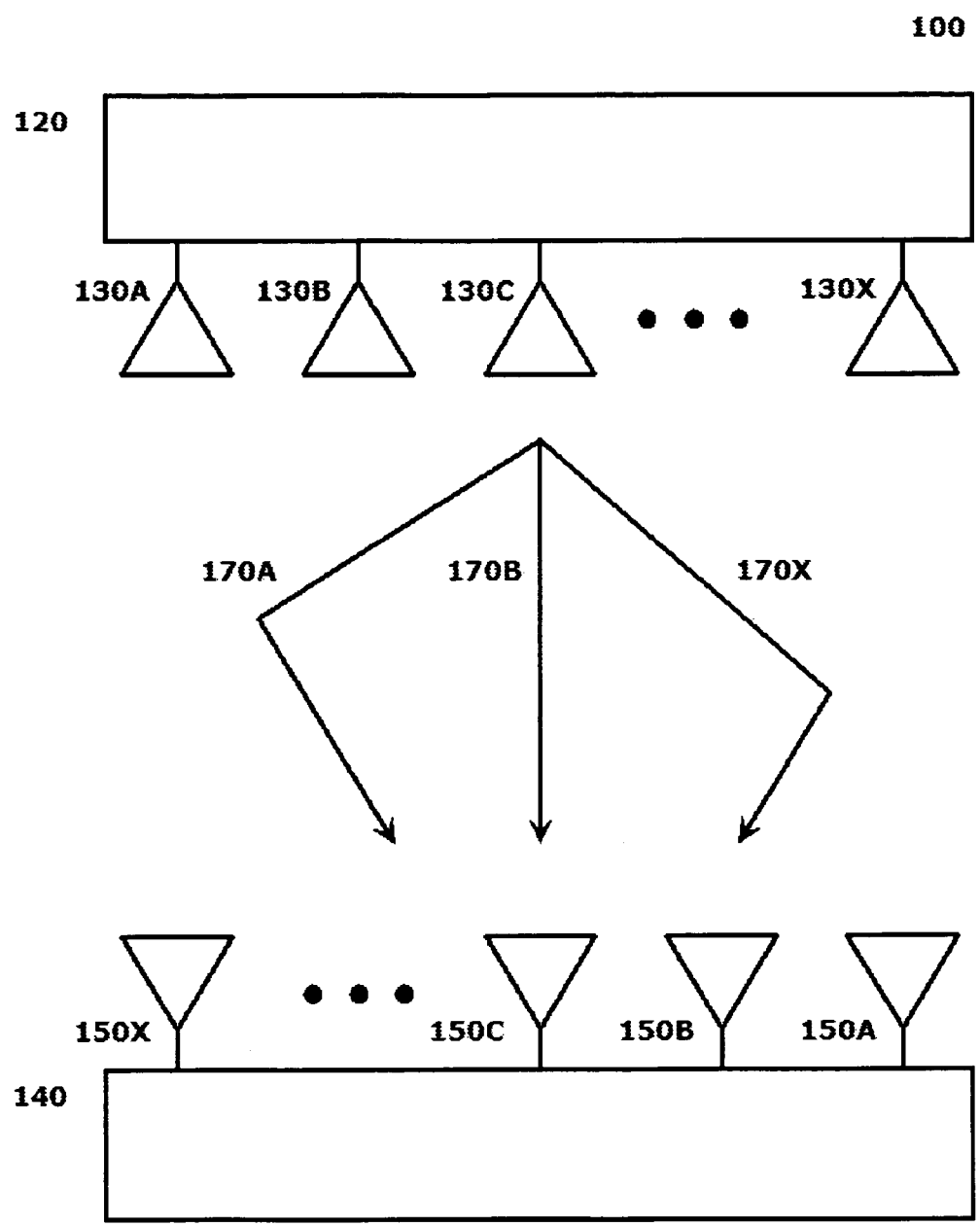
FIG. 1 illustrates an exemplary overview of a conventional and popular implementation of a MIMO scheme used in existing omnidirectional wireless communication systems.
Figure 2:
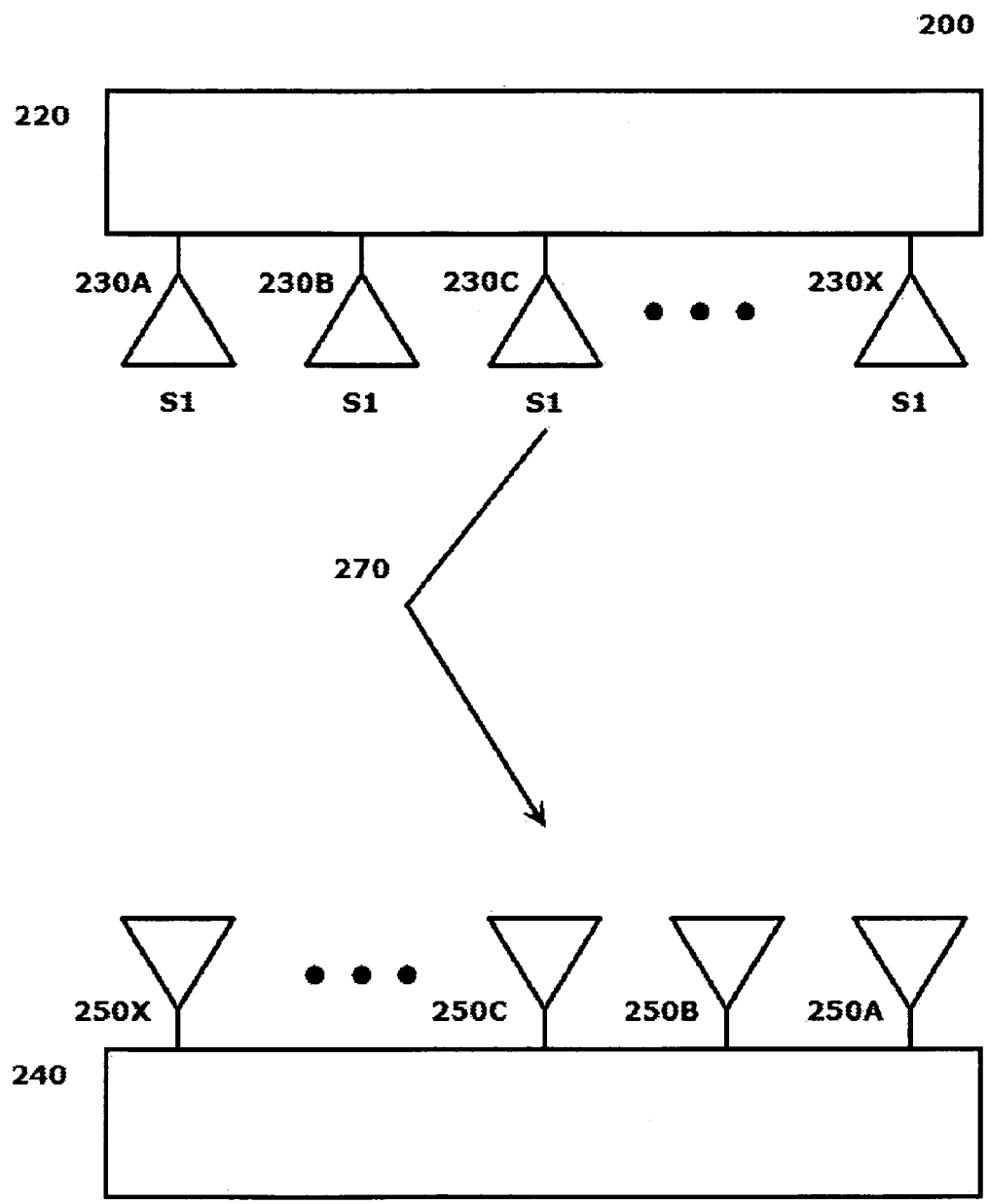
FIG. 2 illustrates an exemplary overview of a currently-planned first generation mmWave wireless communication system including exemplary beamforming according to proposed first generation mmWave wireless communication standards.

The systems and methods for employing MIMO schemes in next generation mmWave wireless communication systems according to this disclosure will generally refer to this specific utility for those systems and methods. Exemplary embodiments described and depicted in this disclosure should not be interpreted as being specifically limited to any particular combination of communicating capabilities in a single transmitting or receiving device, or to any specific system infrastructure, or as limiting any particular intended use for the described system infrastructure, or specific transmitting/receiving devices. In fact, any beamforming scheme, and any complementary configuration for transmitting/receiving devices that may employ the concepts of this disclosure for beamforming in support implementing MIMO schemes in directional wireless communications are contemplated.

Specific reference to, for example, any particular wireless transmitting/receiving device should be understood as being exemplary only, and not limited, in any manner, to any particular class of such devices. The systems and methods according to this disclosure will be described as being particularly adaptable to communications with one or more next generation hand-held wireless transmitting/receiving devices ("transmitter/receiver device") that include at least one mmWave radio. These transmitter/receiver devices are anticipated to include next generation smartphones, tablets, PDAs and devices that mature from these current classes of devices, and the network or other nodes with which these devices communicate. Reference to such devices is made for illustration purposes and the disclosed concepts should not be considered as being limited to only these classes of client devices or their successors in kind. In fact, the wireless transmitter/receiver device, as generally described in this disclosure, need not be mobile or hand-held at all.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individually disclosed elements, and combinations of those elements to form wireless communicating systems, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to (1) systems for implementing a MIMO scheme in a next generation directional wireless communication system, particularly one operating in the mmWave region of the RF frequency spectrum at, for example, 60 GHz, (2) methods for carrying into effect the described implementation of MIMO in such systems, and (3) a corresponding non-transitory computer-readable medium having recorded on it a program that, when executed by a processor causes the processor to execute the steps of one or more of the methods for employing MIMO schemes in next generation mmWave wireless communication systems according to this disclosure.

Figure 3:
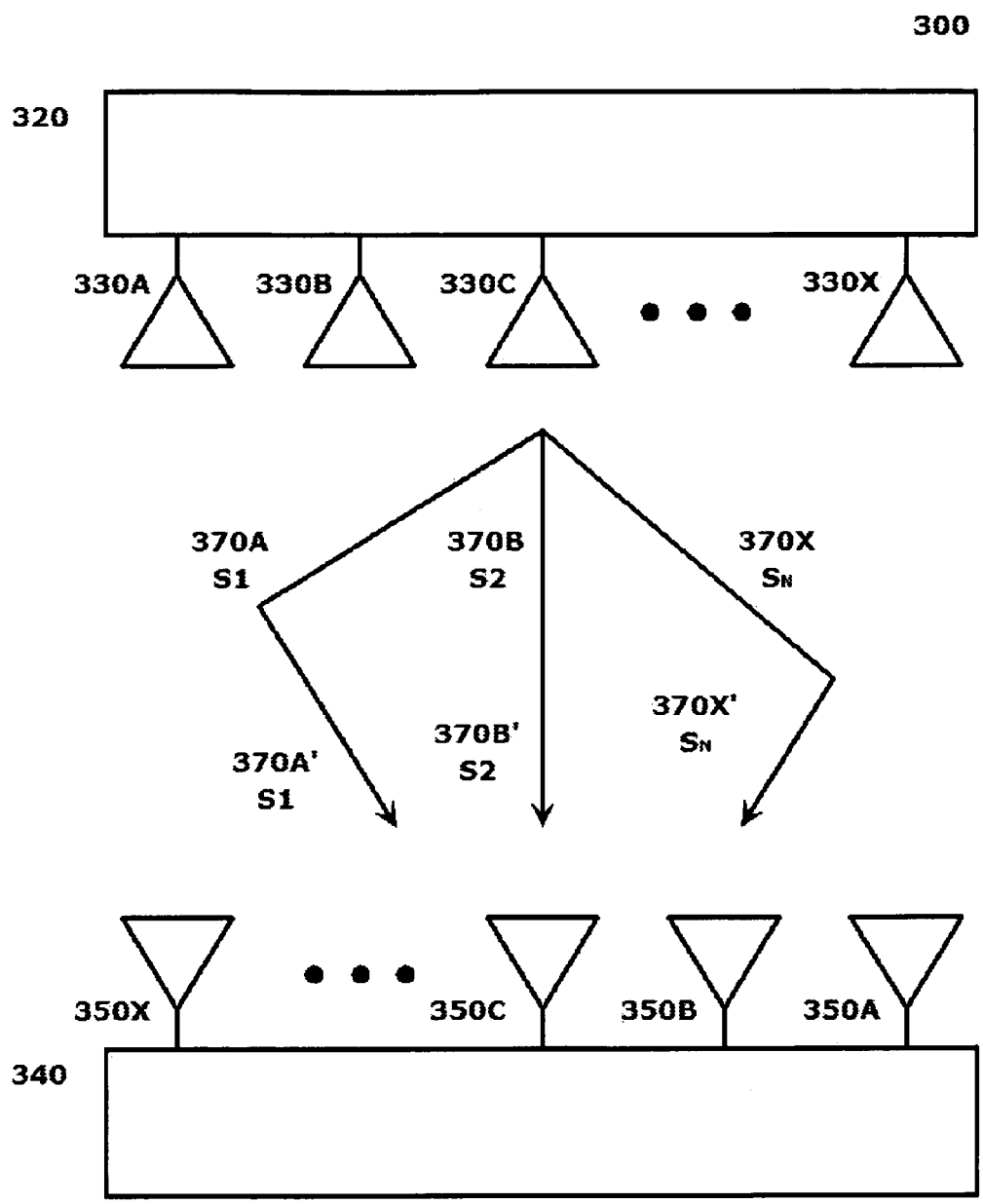
FIG. 3 illustrates an overview of an exemplary concept implementation of a MIMO scheme in a next generation mmWave wireless communication system according to this disclosure.

FIG. 3 illustrates an overview of an exemplary concept 300 for implementation of a MIMO scheme in a next generation mmWave wireless communication system according to this disclosure. Due to the characteristics of mmWave wireless communication systems, the adaptation of the concept of MIMO implementation for use in mmWave communication links is drastically different from the implementation of MIMO as it is applied in existing wireless technologies. FIG. 3 illustrates this adaptation for a different implementation of the concept of MIMO that is herein proposed to be used for mmWave wireless communication systems. For simplicity and ease of understanding, FIG. 3 is limited to depiction of a mmWave wireless communication system including only a single receiver. It should be understood, however, that the depicted concept is intended to encompass multi-user MIMO systems as well.

Unlike in a conventional implementation of a MIMO scheme in an omnidirectional wireless communication system such as that shown in FIG. 1, individually transmitted signal $S1$-$S_N$ are not emitted from individual transmit antennas. See FIG. 1 and the accompanying explanation.

As shown in FIG. 3, individually transmitted signals $S1$-$S_N$ are associated with the separately individually beamformed transmission links 370A-X emanating from a transmitter site 320, and one or more of its associated transmitting antennas 330A-X, to be received by a paired one or more receiving antennas 350A-X associated with a receiver site 340 via beamformed reception links 370A'-X'. This is in specific contrast to the current MIMO scheme shown in FIG. 1. As is discussed above, and will be shown in greater detail below, each of the transmitting antennas 330A-X and the receiving antennas 350A-X include multiple antenna elements to support the respective beamforming processes. At either of the transmit site 320 or the receive site 340, multiple antennas 330A-X, 350A-X, or multiple antenna elements within any individual antenna, may be employed to form the separately individually beamformed transmission links 370A-X and beamformed reception links 370A'-X'.

The above-described configuration provides additional degrees of freedom with regard to how the antennas and the antenna elements are employed, for example, in a beamforming scheme, in a mmWave wireless communication system. Individual signals $S1$-$S_N$ are transmitted and received across links that can be beamformed using differing numbers of individual antenna elements. Initially, a transmitter site 320 may establish two or more beamformed transmission links 370A-X between the transmitter site 320 and the receiver site 340. At the receiver site 320, one or more associated beamformed reception links 370A'-X' may be used to receive each transmitted signal $S1$-$S_N$. This minimizes the interference among different signals $S1$-$S_N$ being transmitted and received across different beamformed links. The number of antenna elements used by the transmitter site 320 for each beamformed transmission link 370A-X, or at the receiver site 340 for each beamformed reception link 370A'-X', can vary. The number of antenna elements used by either of the transmitter site 320 or the receiver site 340 may range from using one, or a small number of, antenna element(s) to using all of the antenna elements of a particular antenna. When a single antenna is used, this latter scenario reduces the resultant effect to that of the first generation mmWave wireless communication systems, thereby allowing for the anticipated degree of backward compatibility. Through each beamformed transmission link 370A-X, and associated beamformed reception link 370A'-X', a different signal S1-$S_N$ is transmitted and received. It should be noted that this in contrast to the existing MIMO technology implementations in omnidirectional wireless communication systems, which do not include individual links, in which a signal is transmitted per antenna. See FIG. 1.

It should be appreciated as well that different signals S1-$S_N$ may emanate from, or otherwise may be received by a same antenna 330A-X, 350A-X, respectively. Because the signals S1-$S_N$ are traveling via different paths over the beamformed transmission links 370A-X and the beamformed reception links 370A'-X', the concept of MIMO can be effected over the differing combined beamformed links.

It should also be appreciated that the respective numbers of antenna elements used to form the beamformed transmission links 370A-X and the beamformed reception links 370A'-X' are likely to be different from each other. In a typical mmWave wireless communication installation, it is possible that the transmitter site 320 may have comparatively larger numbers of larger antennas 330A-X, each antenna including many antenna elements, while a plurality of receiver sites 340 may have smaller numbers of antennas 350A-X with fewer antenna elements. As a result, more beamformed transmission links 370A-X may be formed than beamformed reception links 370A'-X'. Also, receiver sites 340 may have wider beamformed reception links 370A'-X' than the beamformed transmission links 370A-X emanating from transmission sites 320'. In this manner, trade-offs will be balanced such that an individual receiver site 340 may be subject to more or less interference.

In order to support implementation of the above-described MIMO concept in a next generation mmWave wireless communication system, the underlying MAC/PHY protocol may be modified to define capabilities that allow signaling of the availability a MIMO feature among MIMO-capable devices in the mmWave wireless communication system. Basically, a transmitter/receiver device may be able to indicate in a single field that mmWave MIMO is supported by the device. Separate fields may then indicate (a) a maximum number of beamformed transmission links that can be supported by the device and/or (b) a maximum number of beamformed reception links that can be supported by the device. Certain implementation constraints, for example, a number of RF chains, can limit a number of beamformed transmission links that a transmitter/receiver device can employ, while separate implementation constraints can limit a number of beamformed reception links that the transmitter/receiver device can employ. Therefore, separate fields may be provided to indicate how many beamformed transmission links are supported by the transmitter/receiver device transmitting the separate field, and how many beamformed reception links are supported by the transmitter/receiver device transmitting this separate field.

The above information may affect how the beamforming protocol is performed to find the respective number of beamformed links. The beamforming algorithm and the MIMO scheme will need to account for the number of complete beamformed links that can be established between transmitter/receiver devices. A total number of complete beamformed links that can be established between a transmitting transmitter/receiver device and a receiving transmitter/receiver device will establish how many separate signals can be supported for the immediate implementation of the MIMO scheme.

Because it affects an overall data throughput for the MIMO scheme implemented in a particular mmWave wireless communication system, an intelligent allocation of numbers of individual antenna elements to each of the beamformed transmission links 370A-X and the beamformed reception links 370A'-X' may be established. As was noted above, the number of antenna elements used by the transmitter site 320 for each beamformed transmission link 370A-X, or by the receiver site 340 for each beamformed reception link 370A'-X', can vary. In other words, the number of antenna elements and the beam patterns for each of the exemplary beamformed transmission links 370A-X and beamformed reception links 370A'-X' shown in FIG. 3 can be different. Further, depending on a sophistication of the beamforming scheme employed by the mmWave wireless communication system, the respective numbers of antenna elements could be made to vary dynamically. For example, one combination of numbers of respective antenna elements dedicated to forming the respective beamformed transmission links 370A-X and beamformed reception links 370A'-X' may be employed as a first configuration during a training/search phase while another combination of numbers of respective antenna elements dedicated to maintaining the respective beamformed transmission links 370A-X and beamformed reception links 370A'-X' may be employed as a second configuration once the beamformed links are established.

A first exemplary method by which to allocate antenna elements as discussed above is to allocate the respective antenna elements on a "per device" basis. This first exemplary method simply divides a number of transmission antenna elements associated with the transmitter 320 or a number reception antenna elements associated with the receiver 340 by a number of intended peer devices, i.e., for the transmitter 320, the number of receivers 340 with which the transmitter 320 is intended to establish multiple beamformed links, and for the receiver 340, the number of transmitters 320 with which the receiver 340 is intended to establish multiple beamformed links. As an example, if the transmitter 320 has 36 antenna elements and there are 3 receivers 340 with which the transmitter 320 is intended to establish beamformed links, an antenna element allocation scheme in the transmitter 320 could simply allocate 12 antenna elements for each receiver 340 to allow support for multi-user beamforming based on the MIMO concept for this particular configuration of a mmWave wireless communication system. This first antenna element allocation method may, for example, be considered to emulate a current MIMO scheme implemented by an omnidirectional wireless access point. Multiple receiving devices may be supported across multiple beamformed wireless communication links emanating from the transmitter 320 to each of multiple receivers 340. For example, signals S1 and S2 may be carried on a first pair of separate beamformed links from the transmitter 320 to a first receiver 340, signals S3 and S4 may be carried on a second pair of separate beamformed links from the transmitter 320 to a second receiver 340, and signals S5 and S6 may be carried on a third pair of separate beamformed links from the transmitter 320 to a third receiver 340. Because a next generation mmWave communication system wireless access point may be dealing with multiple client devices, this first antenna element allocation method may provide an easy manner by which a transmitter 320 accessing multiple client devices, i.e., multiple receivers 340, may allocate its antenna elements to establish the multiple beamformed links with each of the multiple receivers 340.

A second exemplary method by which to allocate antenna elements as discussed above is to allocate the respective antenna elements based on a Signal (plus Interference) to Noise Ratio (S(I)NR). Those of skill in the art recognize that available data rates are related to S(I)NR. According to this second exemplary method, during a process of performing beamforming between a pair of source and destination devices such as, for example, the transmitter 320 and receiver 340, a number N where N>2 of beamformed links may be found. A cooperating pair of a transmitter 320 and a receiver 340 may execute processing to select respective numbers of antenna elements to be used in each of multiple beamformed links established on the basis of a predetermined S(I)NR for a specific link, or otherwise based on relative location information for the cooperating pair of the transmitter 320 and the receiver 340. As an example, for N=3 beamformed links, the transmitter 320 having a total of 36 antenna elements could allocate 16 antenna elements for the beamformed link 1, 12 antenna elements for the beamformed link 2 and 8 antenna elements for the beamformed link 3 according to a measured S(I)NR for each of the links in relation to the predetermined S(I)NR. An objective of this second exemplary antenna element allocation method is to attempt to ensure that a combined S(I)NR exceeds a target S(I)NR for each of a pair of a cooperating transmitter 320 and receiver 340 in order to attempt to guarantee that a specific data rate is achievable across the multiple beamformed links between the cooperating transmitter 320 and receiver 340.

A third exemplary method by which to allocate antenna elements as discussed above is to allocate the respective antenna elements based on a per application Quality of Service (QoS) requirement. According to this third exemplary embodiment, different from allocating a set number of antenna elements on the basis of S(I)NR, as discussed in the second exemplary embodiment, at least one of a transmitter 320 and a receiver 340 may allocate antenna elements to meet specifically-defined application requirements such as a minimum data rate, a minimum Packet Error Rate (PER) or other characteristic communication link quality assessment parameter. As an example, in a video streaming application, the transmitter 320 could transmit more visually important parts of a video stream, such as, for example, I frames, header and motion vector data partitions, using a comparatively larger number of antenna elements, and less important parts of the video stream such as, for example, P and B frames, using a comparatively lesser number of antenna elements. This configuration would likely provide more robust video streaming performance by employing a decision process by which the MIMO scheme is able to evaluate and allocate single data according to a specific antenna allocation.

Figure 4:
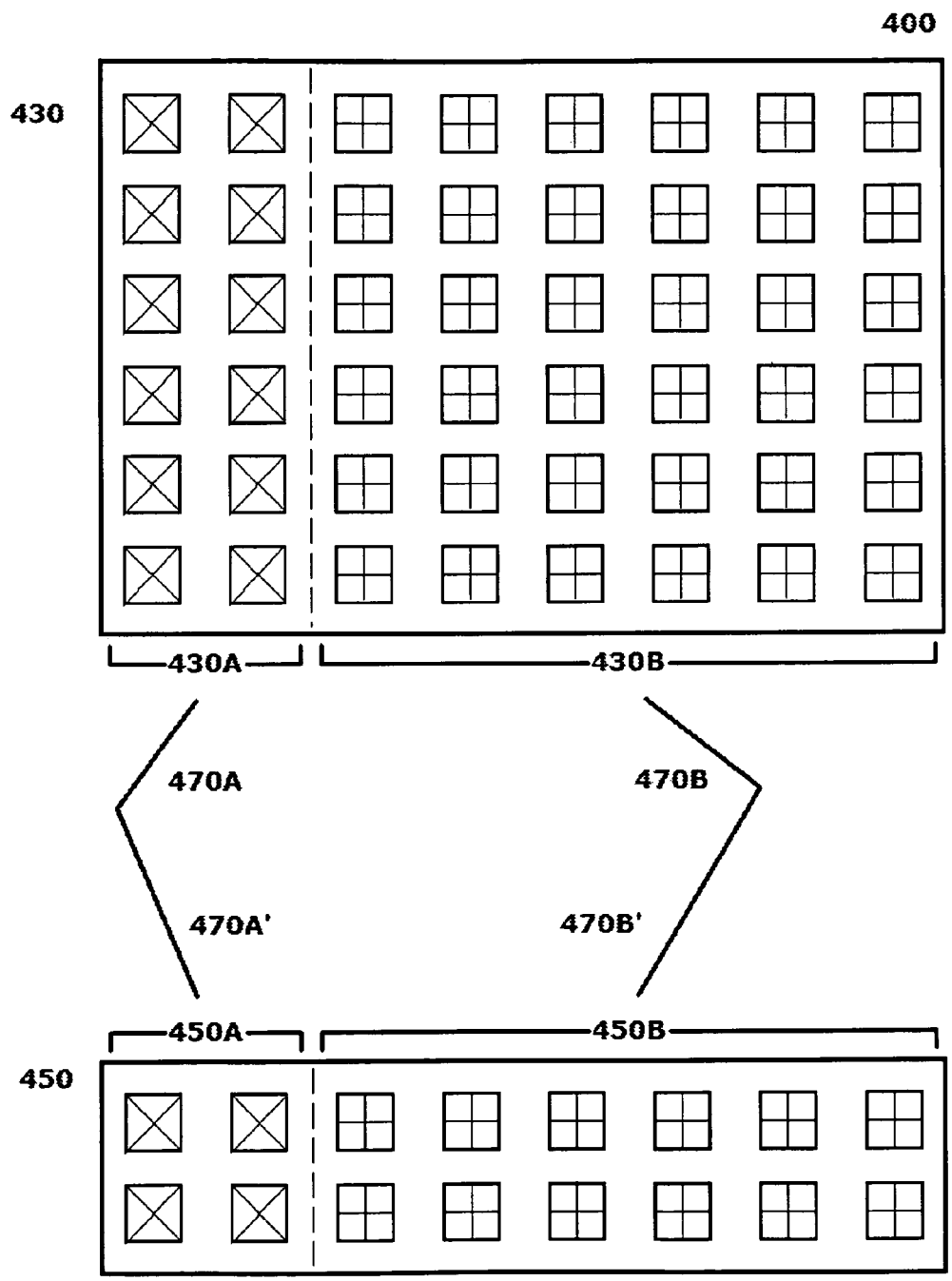
FIG. 4 illustrates an exemplary antenna element allocation scheme in support of an implementation of a MIMO scheme in a next generation mmWave wireless communication system according to this disclosure.

FIG. 4 illustrates an exemplary antenna element allocation scheme 400 in, for example, a single antenna, in support of an implementation of a MIMO scheme in a next generation mmWave wireless communication system according to this disclosure. As shown in FIG. 4, a transmission site antenna array 430 includes 48 antenna elements. Of the 48 antenna elements in the transmission site antenna array 430, 12 antenna elements 430A (marked with x's) are allocated to forming a first beamformed transmission link 470A, while 36 antenna elements 430B (marked with +'s) are allocated to forming a second beamformed transmission link 470B. In like manner, a reception site antenna array 450 includes 16 antenna elements. Of the 16 antenna elements in the reception site antenna array 450, 4 antenna elements 450A (marked with x's) are allocated to forming a first beamformed reception link 470A', while 12 antenna elements 450B (marked with +'s) are allocated to forming a second beamformed reception link 470W. While FIG. 4 indicates contiguous sets of antenna elements 430A,B and 450A,B being allocated the depicted beamformed links according to generally accepted practices in which specific geometric combinations of individual elements in the antenna array are grouped, the numbers and locations of the antenna elements used for any individual beamformed link can be dynamically assigned, and randomly dispersed throughout the antenna array in virtually any configuration, to support the exemplary antenna element allocation methods described above, and others.

Figure 5:
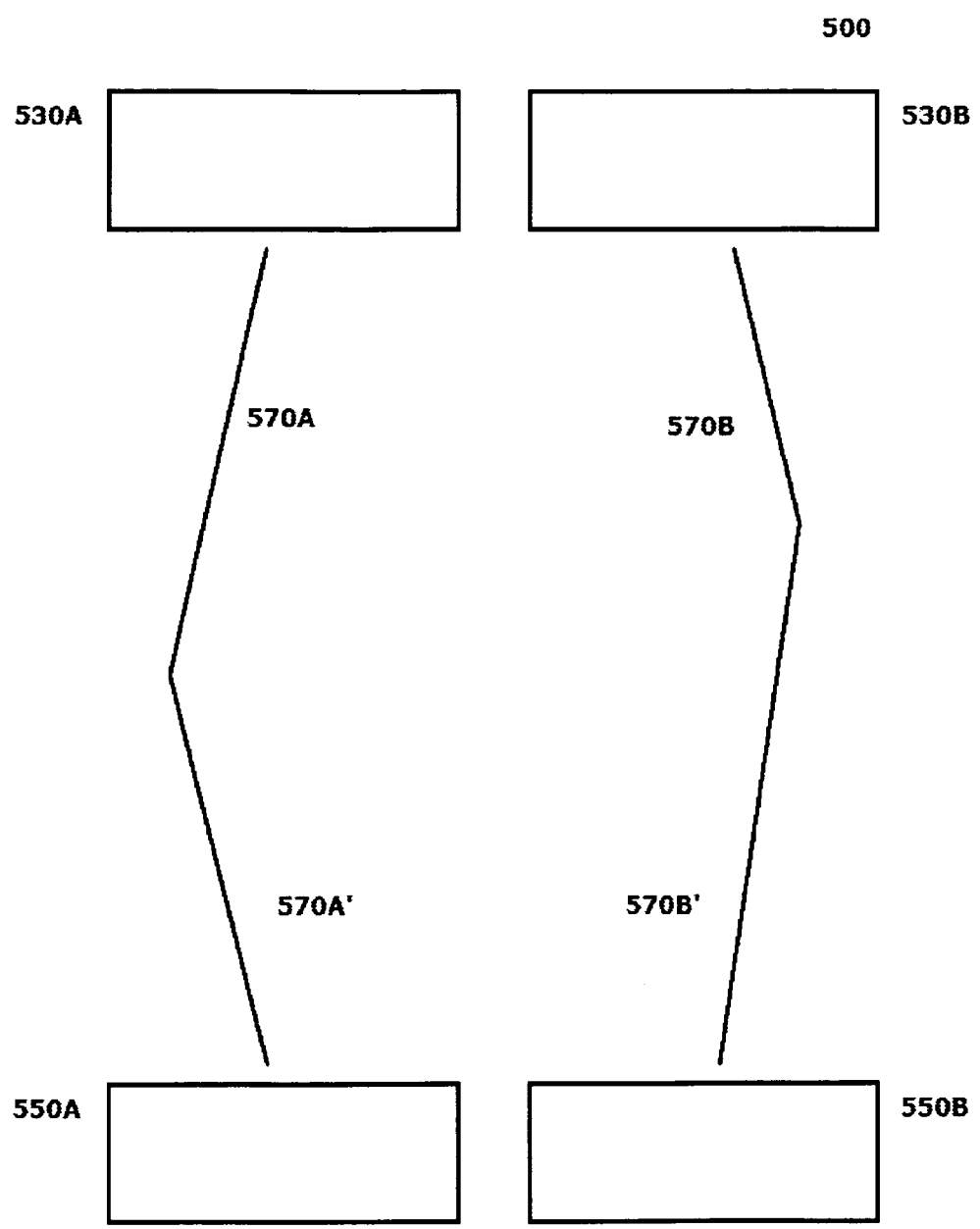
FIG. 5 illustrates an exemplary antenna allocation scheme in support of an implementation of a MIMO scheme in a next generation mmWave wireless communication system in which each of a source node and a destination node in the next generation mmWave communication link possess more than one antenna according to this disclosure.

FIG. 5 illustrates an exemplary antenna allocation scheme 500 in support of an implementation of a MIMO scheme in a next generation mmWave wireless communication system in which each of a source node (transmitter) and a destination node (receiver) in the next generation mmWave communication link possess more than one antenna array according to this disclosure. As shown in FIG. 5, there is more than one antenna array 530A,B at the transmission site to form the beamformed transmission links 570A,B with the multiple antenna elements in each antenna array 530A,B, and there is more than one antenna array 550A,B at the reception site to form the beamformed reception links 570A',B' with the multiple antenna elements in each antenna array 550A,B. In this manner, both sets of antenna arrays 530A,B and 550A,B are used to increase an overall communication capacity between a transmission site device and a reception site device. The use of more than one antenna array may provide higher throughput, higher robustness and longer range for the beamformed communication links between the transmission site device and the receiver site device. In fact, it is anticipated that increasing the number of antennas N times at both the transmitter and receiver will increase the available data rate N times over first generation mmWave wireless communication systems.

Figure 6:
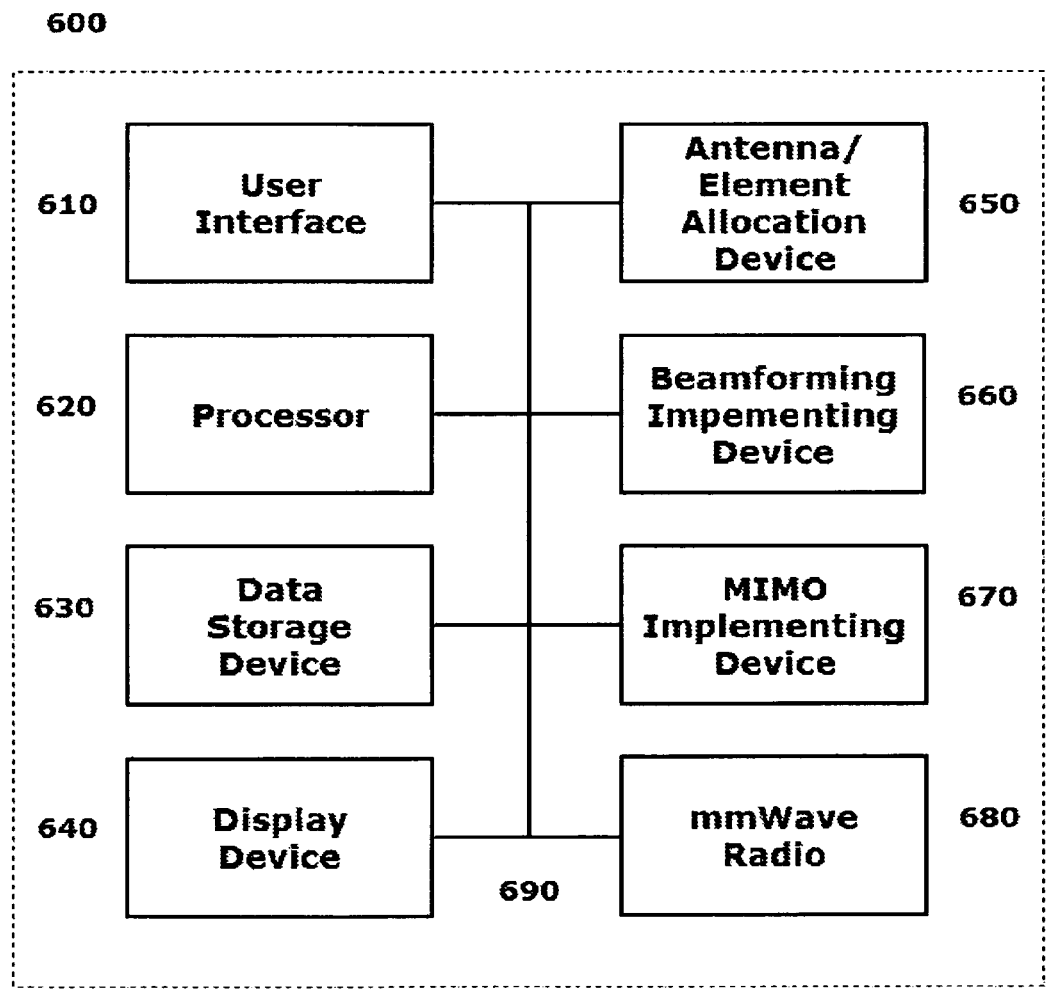
FIG. 6 illustrates a block diagram of an exemplary transmitter/receiver device that constitutes one end of a next generation mmWave wireless communication link in which a MIMO scheme may be implemented according to this disclosure.

FIG. 6 illustrates a block diagram of an exemplary transmitter/receiver device 600 that constitutes one end of a next generation mmWave wireless communication link in which a MIMO scheme may be implemented according to this disclosure. The transmitter/receiver device 600 may be, for example, a smartphone, tablet, PDA or other like mobile device. The transmitter/receiver device 600 may otherwise be a substantially fixed wireless unit.

The transmitter/receiver device 600 may include a user interface 610 by which a user can communicate with the transmitter/receiver device 600, and may otherwise communicate information via the transmitter/receiver device 600 to a cooperating transmitter/receiver device at an other end of the next generation mmWave wireless communication link in which a MIMO scheme may be implemented with which the transmitter/receiver device 600 is in wireless communication. The user interface 610 may be configured as one or more conventional mechanisms that permit a user to input information to the transmitter/receiver device 600. The user interface 610 may include, for example, an integral keyboard, or a touchscreen with "soft" buttons, for communicating commands and information to the transmitter/receiver device 600. The user interface 610 may alternatively include, as appropriate, a separate keyboard and mouse, or a microphone by which a user may provide oral commands to the transmitter/receiver device 600 to be "translated" by a voice recognition program or otherwise. The user interface 610 may otherwise include any other like device for user operation of, and data exchange with, the transmitter/receiver device 600. A user may make inputs via the user interface 610 to provide information regarding, for example, an ability of the transmitter/receiver device 600 to support a MIMO scheme across a plurality of beamformed links. Separately, a user may make inputs via the user interface 610 to respond to inquiries from an other transmitter/receiver device for attempting, for example, to establish beamformed links and to implement a MIMO scheme with the other transmitter/receiver device.

The transmitter/receiver device 600 may include one or more local processors 620 for individually undertaking the processing and control functions that are carried out by the transmitter/receiver device 600. Processor(s) 620 may include at least one conventional processor or microprocessor that interprets and executes instructions and processes outgoing and incoming data transmitted to or received from a mmWave communication link to implement a MIMO scheme across the mmWave communication link.

The transmitter/receiver device 600 may include one or more data storage devices 630. Such data storage device(s) 630 may be used to store data, and operating programs or applications to be used by the transmitter/receiver device 600, and specifically the processor(s) 620, particularly programs and applications that support a beamforming scheme to establish multiple separate beamformed communication links with a cooperating transmitter/receiver device and that in turn support implementing a MIMO scheme among the multiple separate beamformed communication links once established. Such data storage device(s) 630 may further store algorithms and parameters to carry into effect one or more of the above-discussed antenna allocation methods. Data storage device(s) 630 may include a random access memory (RAM) or another type of dynamic storage device that stores beamforming information, MIMO implementation information or other information and instructions for execution by the processor(s) 620. Data storage device(s) 630 may also include a read-only memory (ROM), which may include a conventional ROM device or another type of static storage device that stores static information and instructions for execution by the processor(s) 620. The data storage device(s) 630 will generally be those that are integral to the transmitter/receiver device 600, but may also be provided external to, and in wireless communication with, transmitter/receiver device 600.

The transmitter/receiver device 600 may include at least one data display device 640 which may be configured as one or more conventional mechanisms that display information to the user of the transmitter/receiver device 600 for operation of the transmitter/receiver device 600 in its various operations, or otherwise for displaying, for example, data received from a cooperating transmitter/receiver device via the combination of separate beamformed communication links communicating separate signals in implementing a MIMO scheme between the transmitter/receiver device 600 and the cooperating transmitter/receiver device.

The transmitter/receiver device 600 may include one or more antenna/element allocation devices 650. Such an antenna/element allocation device 650 may autonomously, or in cooperation with the processor(s) 620 and/or data storage devices 630, be used by the transmitter/receiver device 600 to select among and/or execute one or more of the above exemplary methods, or some other related method, for antenna allocation in either or both of the transmitter/receiver device 600 and a cooperating transmitter/receiver device with which the transmitter/receiver device 600 is in wireless communication. The transmitter/receiver device 600 may be able to provide, upon request, information regarding an antenna capacity and preferred antenna allocation method to the cooperating transmitter/receiver device to define a particular allocation of antenna elements in support of a beamforming scheme to establish multiple beamformed communication links between the transmitter/receiver device 600 and the cooperating transmitter/receiver device.

The transmitter/receiver device 600 may include a separate beamforming implementing device 660. Such a beamforming implementing device 660, like the antenna/element allocation device 650, may autonomously, or in cooperation with the processor(s) 620 and/or data storage devices 630, be used by the transmitter/receiver device 600 to implement the processes to establish and maintain a plurality of beamformed communication links between the transmitter/receiver device 600 and one or more cooperating transmitter/receiver devices with which the transmitter/receiver device 600 is in wireless communication. The transmitter/receiver device 600 may be able to provide, upon request, information regarding a number of available beamformed links that can be supported by the transmitter/receiver device 600, apart from, or in consideration of, an antenna allocation method determined by the transmitter/receiver device 600 or the one or more cooperating transmitter/receiver devices to implement a beamforming scheme to establish and maintain the multiple beamformed communication links between the transmitter/receiver device 600 and each of the one or more cooperating transmitter/receiver device that will support implementing a MIMO scheme between the devices.

The transmitter/receiver device 600 may include a separate MIMO implementing device 670. Such a MIMO implementing device 670 may also autonomously, or in cooperation with the processor(s) 620 and/or data storage devices 630, be used by the transmitter/receiver device 600 to execute a signal separating scheme on a transmission side or a signal combining scheme on a receiver side in the transmitter/receiver device 600. In this manner, the MIMO implementing device 670 may cause separate signals to be transmitted across each of the plurality of beamformed communication links between the transmitter/receiver device 600 and a cooperating transmitter/receiver device with which the transmitter/receiver device 600 is in wireless communication. This may be one exemplary manner by which the MIMO implementing device 670 implements a MIMO scheme across the individual beamformed communication links between the transmitter/receiver device 600 and the cooperating transmitter/receiver device.

The transmitter/receiver device 600 may include a combination of different individual radio devices within a single integrated package. For the purposes of this disclosure, as shown in FIG. 6, the only radio device that may be included to carry into effect the MIMO scheme in the next generation mmWave communication system is the mmWave radio 680, which represents an external data communication interface for specific, likely 60 GHz, communication with a cooperating transmitter/receiver device across multiple beamformed communication links between the devices.

All of the various components of the transmitter/receiver device 600, as depicted in FIG. 6, may be connected by one or more data/control busses 690. The data/control bus(ses) 690 may provide internal wired or wireless communication between the various components of the transmitter/receiver device 600, when all of those components are housed integrally in the transmitter/receiver device 600. Otherwise, the various disclosed elements of the transmitter/receiver device 600 may be arranged in combinations of sub-systems as individual components or combinations of components, housed in a single location or remotely dispersed in multiple locations and in wired or wireless communication with other of the individual components of the transmitter/receiver device 600. In other words, no specific configuration as an integral unit or as a support unit, or as several units or sub-systems widely dispersed, for the transmitter/receiver device 600 is to be implied by the depiction in FIG. 6.

The disclosed embodiments may include a method for implementing a MIMO scheme in a next generation mmWave communication system. According to the exemplary method, one potentially cooperating mmWave transmitter/receiver device may attempt to initiate communications with one or more other potentially cooperating mmWave transmitter/receiver devices. The method may make a determination regarding whether each of the potentially cooperating mmWave transmitter/receiver devices is capable of implementing a MIMO scheme across a mmWave communication link between a pair, or each pair, of potentially cooperating mmWave transmitter/receiver devices. The determination is made that a pair of potentially cooperating mmWave transmitter/receiver devices is capable of implementing a MIMO scheme between the devices, the method may establish how many beamformed links can be supported between the pair of potentially cooperating mmWave transmitter/receiver devices. The method may also establish a preferred antenna allocation scheme between the pair potentially cooperating mmWave transmitter/receiver devices. With some, or all, of the above acquired information between the pair potentially cooperating mmWave transmitter/receiver devices, the method may establish multiple being formed links between the pair of cooperating mmWave transmitter/receiver devices. Once multiple beamformed links are established between the pair of cooperating mmWave transmitter/receiver devices, the method may implement a MIMO scheme between the pair of cooperating mmWave transmitter/receiver devices. Such a MIMO scheme, as discussed above, may involve dividing the high data rate signal into multiple separate signal components, transmitting of multiple separate signal components across multiple separate being formed links between the pair of cooperating mmWave transmitter/receiver devices, and at a receiver side, combining the multiple separate signal components to restore the high data rate signal. The method may continue the MIMO-implemented communication between the pair of cooperating mmWave transmitter/receiver devices until the data exchange between those devices is completed.

Figure 7:
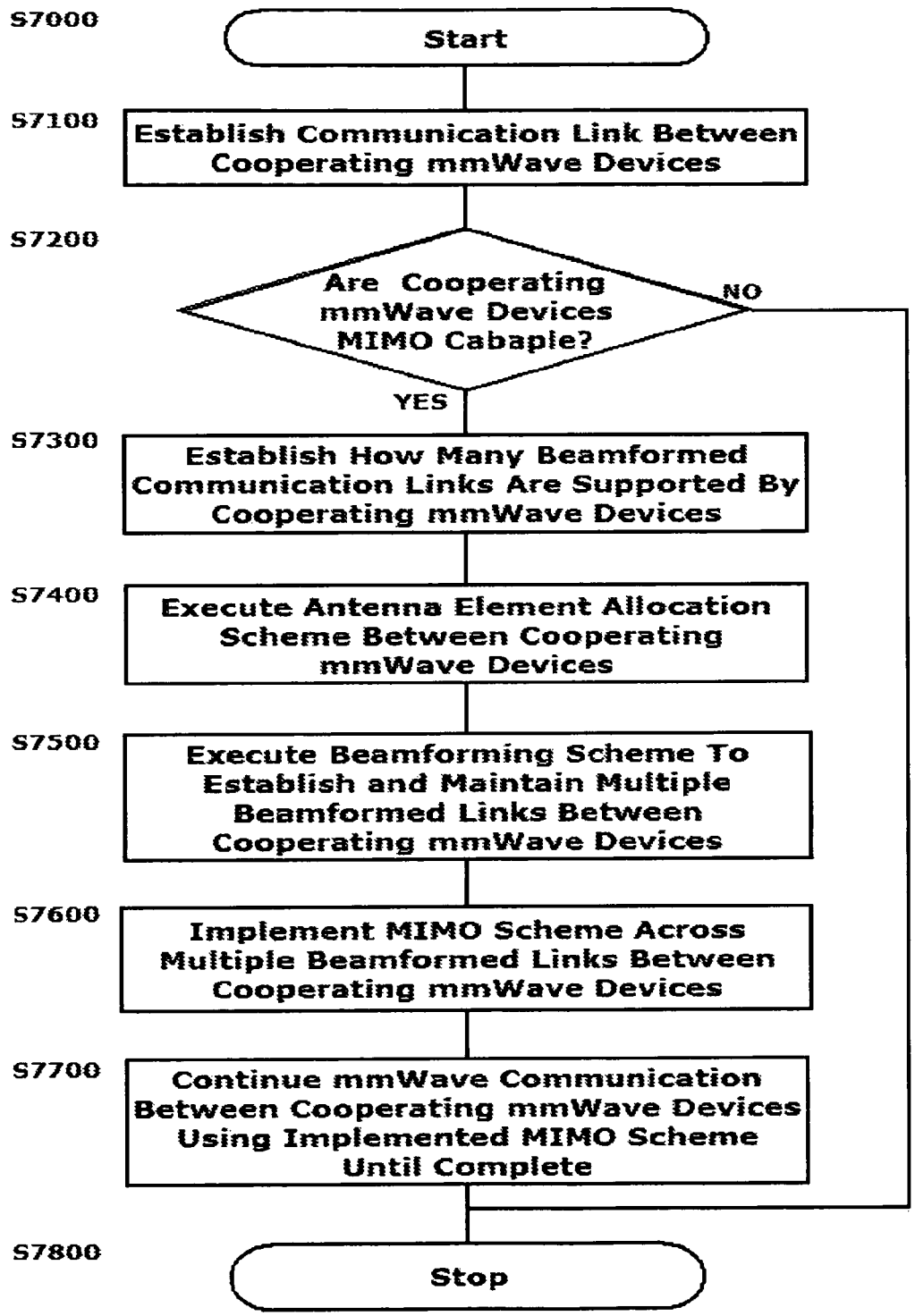
FIG. 7 illustrates a flowchart of an exemplary method for implementation of a MIMO scheme in a next generation mmWave wireless communication system according to this disclosure.

FIG. 7 illustrates a flowchart of an exemplary method for implementation of a MIMO scheme in a next generation mmWave wireless communication system according to this disclosure. As shown in FIG. 7, operation of the method commences at Step S7000 and proceeds to Step S7100.

In Step S7100, one potentially cooperating mmWave transmitter/receiver device may attempt to establish communication with an other potentially cooperating mmWave transmitter/receiver device. The one potentially cooperating mmWave transmitter/receiver device may attempt to establish this communication by, for example, initiating a request to communicate with the other potentially cooperating mmWave transmitter/receiver device using any available means including one or more non-mmWave communication links supported by one or more non-mmWave radios in each of the potentially cooperating mmWave transmitter/receiver devices. Operation of the method proceeds to Step S7200.

Step S7200 is a determination step. In Step S7200, a determination is made, based on information that is available in, and exchangeable between, the pair of potentially cooperating mmWave transmitter/receiver devices, whether the pair of potentially cooperating mmWave transmitter/receiver devices are capable of implementing a MIMO scheme between them. This capability may be established by, for example, transmitting a separate bit field in the MAC/PHY protocol to indicate that each of the potentially cooperating mmWave transmitter/receiver devices is MIMO capable.

If, in Step S7200, it is determined that either, or both, of the potentially cooperating mmWave transmitter/receiver devices it is not MIMO capable, operation of the method proceeds to Step S7800 where operation of the method ceases. It should be noted that a determination that the pair potentially cooperating mmWave transmitter/receiver devices is not MIMO capable does not preclude communication between that pair of potentially cooperating mmWave transmitter/receiver devices. It simply puts that communication, even mmWave communication outside the scope of the disclosed method.

If, in Step S7200, it is determined that both of the potentially cooperating mmWave transmitter/receiver devices it is MIMO capable, operation of the method proceeds to Step S7300.

In Step S7300, the pair potentially cooperating mmWave transmitter/receiver devices exchange information to resolve how many beamformed links may be established between the potentially cooperating mmWave transmitter/receiver devices. Again here, the underlying MAC/PHY protocol may include one or more bit fields transmitted from each of the potentially cooperating mmWave transmitter/receiver devices to the other, for example, a maximum number of transmission and/or reception beamformed links that each of the potentially cooperating mmWave transmitter/receiver devices is capable of supporting. Processing may then be undertaken in one or the other of the potentially cooperating mmWave transmitter/receiver devices, based on information provided, to determine a total, or appropriate, number of separate multiple beamformed links to be established between the pair of potentially cooperating mmWave transmitter/receiver devices. Operation of the method proceeds to Step S7400.

In Step S7400, having established the total number of separate multiple beamformed links to be established between the pair of potentially cooperating mmWave transmitter/receiver devices, an optimal antenna allocation scheme may be undertaken by either, or both, of the pair of potentially cooperating mmWave transmitter/receiver devices. This antenna allocation scheme may follow one of the proposed exemplary methods for antenna allocation described above including, for example, a "per device," "per S(I)NR" or "per QoS" allocation, or may be established by some other method for antenna allocation as may be understood by those of skill in the art. Operation the method proceeds to Step S7500.

In Step S7500, having established the total number of separate multiple beamformed links to be established between the pair of potentially cooperating mmWave transmitter/receiver devices, and an antenna allocation scheme supporting the forming of that total number of separate multiple beamformed links, each of the pair of cooperating mmWave transmitter/receiver devices may execute a beamforming scheme, including an antenna allocation scheme, to establish the separate multiple beamformed links between the devices. It is anticipated that the beamforming scheme for each of the separate multiple beamformed links will be undertaken by known methods, and according to an agreed antenna element allocation, between the pair of cooperating mmWave transmitter/receiver devices. Operation of the method proceeds to Step S7600.

In Step S7600, with the beamforming process complete, or nearly complete, establishing the separate multiple beamformed communication links between the cooperating mmWave transmitter/receiver devices, the devices may then implement a MIMO scheme between them. As discussed in detail above, and implemented MIMO scheme to be undertaken between cooperating mmWave transmitter/receiver devices includes transmitting separate multiple signal portions across separate multiple beamformed links between the cooperating mmWave transmitter/receiver devices. Operation the method proceeds to Step S7700.

In Step S7700, across an established set of multiple beamformed links between cooperating mmWave transmitter/receiver devices, MIMO implemented high data rate mmWave communication continues until there is no longer a need for the high data rate mmWave communication links, at which point operation of the method proceeds to Step S7800 where operation of the method ceases.

The disclosed embodiments may include a non-transitory computer-readable medium storing instructions which, when executed by a processor, may cause the processor to execute the steps of a method as outlined above.

The above-described exemplary systems and methods reference certain known, or in development, components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor to execute beamforming, MIMO implementation and data exchange between cooperating devices. Generally, these program modules may include routine programs, objects, components, data structures, and the like that perform the particular tasks described, or implement particular data types.

Those skilled in the art will appreciate that other embodiments of the disclosed subject matter may be envisioned for execution in a mmWave communication environment with many types communication equipment and computing system configurations, particularly in, for example, a hand-held or otherwise portable mmWave capable mmWave transmitter/receiver device as may be available as programmable consumer electronics.

Embodiments may also be practiced in distributed network communication environments where tasks, generally as outlined above, may be performed by local and remote processing devices that are linked to each other by hard-wired links, wireless links, or a combination of both through a communication network that includes at least mmWave radios in fixed or mobiles mmWave transmitter/receiver devices that make up ends of a potential separate multiple beamformed link communication connection.

Embodiments within the scope of the present disclosure may also include computer-readable media having stored computer-executable instructions or data structures that can be accessed, read and executed by the mmWave transmitter/receiver devices. Such computer-readable media can be any available media that can be accessed by a processor in, or in communication with, the a mmWave transmitter/receiver device. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause individual wireless communication devices, or processors in such devices, to perform certain of the above-specified functions, individually, or in combination. Computer-executable instructions also include program modules that are remotely stored for access by the wireless communication devices to be executed by processors in the wireless communication devices when those devices are caused to communicate in wireless communication environments across any communication link such as the separate multiple mmWave wireless communication links depicted and described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. For example, the principles of the disclosure may be applied to each individual of one or more mobile mmWave transmitter/receiver devices operating in a particular network communicating environment in communication, for example, with a single central mmWave transmitter receiver node device. This enables each user to use the benefits of the disclosure even if any one of a large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method performed by a transmitter/receiver device for executing wireless communications, comprising:
   determining, by a processor, if a pair of millimeter wave (mmWave) wireless communicating devices are implementing a multiple-input multiple output (MIMO) scheme between said pair of mmWave wireless communicating devices;
   establishing multiple separate beamformed links between the pair of mmWave wireless communicating devices; and implementing the MIMO scheme between the pair of mmWave wireless communicating devices;
wherein the processor determines if the pair of mmWave wireless communicating devices are implementing the MIMO scheme between said pair of mmWave wireless communicating devices based on information provided by each one of the pair of mmWave wireless communicating devices;
wherein the information provided by each one of the pair of mmWave wireless communicating devices being a separate field in a MAC/PHY protocol for each one of the pair of mmWave wireless communicating devices.

2. The method of claim 1, the implemented MIMO scheme comprising:
separating an outgoing signal into individual signal elements at a transmission side;
transmitting each of the individual signal elements across a different one of the multiple separate beamformed links between the pair of mmWave wireless communicating devices;
separately receiving, at a reception side, each of the individual signal elements transmitted across the different one of the multiple separate beamformed links; and
reassembling the separately received individual signal elements at the reception side to acquire the outgoing signal.

3. The method of claim 1, further comprising determining, by the processor, a number of separate beamformed links that are established between the pair of mmWave wireless communicating devices based on information provided in separate fields in a MAC/PHY protocol for each of the pair of mmWave wireless communicating devices.

4. The method of claim 3, the separate fields in the MAC/PHY protocol for each of the pair of mmWave wireless communicating devices indicating at least one of a maximum number of beamformed transmission links and a maximum number of beamformed reception links that a one of the pair of mmWave wireless communicating devices transmitting the separate bit fields supports.

5. The method of claim 1, further comprising executing an antenna element allocation scheme that assigns a number of antenna elements available in at least one of the pair of mmWave wireless communicating devices to each of the multiple separate beamformed links between the pair of mmWave wireless communicating devices.

6. The method of claim 5, the pair of mmWave wireless communicating devices comprising multiple pairs of mmWave wireless communicating devices including a single transmitting mmWave wireless communicating device and multiple receiving mmWave wireless communicating devices, and
the antenna element allocation scheme for the single transmitting mmWave wireless communicating device is based on allocating a number of antenna elements to each of the multiple receiving mmWave wireless communicating devices on an equal basis.

7. The method of claim 5, the antenna element allocation scheme being based on a requirement that a Signal (plus Interference) to Noise Ratio S(I)NR between the pair of mmWave wireless communicating devices exceeds a predetermined S(I)NR.

8. The method of claim 5, the antenna allocation scheme being based on a requirement that a Quality of Service (QoS) for a signal received at a reception side of the communication link exceeds a predetermined QoS.

9. The method of claim 8, the QoS being based on at least one of a data rate, a Packet Error Rate or other characteristic communication link quality assessment parameter.

10. A system for executing wireless communications, comprising:
a first mmWave wireless communicating device and at least one second mmWave wireless communicating device, each of the first mmWave wireless communicating device and the at least one second mmWave wireless communicating device comprising:
a mmWave radio;
a beamforming device that executes a beamforming scheme to establish multiple separate beamformed links between the first mmWave wireless communicating device and the at least one second mmWave wireless communicating device; and
a MIMO implementing device that executes a MIMO scheme across the established multiple separate beamformed links between the first mmWave wireless communicating device and the at least one second mmWave wireless communicating device, the MIMO scheme including at least:
separating an outgoing signal from one of the first mmWave wireless communicating device and the at least one second mmWave wireless communicating device into individual signal elements,
transmitting each of the individual signal elements across a different one of the multiple separate beamformed links between the first mmWave wireless communicating device and the at least one second mmWave wireless communicating device;
separately receiving, at an other of the first mmWave wireless communicating device and the at least one second mmWave wireless communicating device, each of the individual signal elements transmitted across the different one of the multiple separate beamformed links; and
reassembling the separately received individual signal elements at the other of the first mmWave wireless communicating device and the at least one second mmWave wireless communicating device to acquire the outgoing signal;
wherein the MIMO implementing device being configured to determine if another mmWave wireless communicating device is implementing the MIMO scheme between one of the first mmWave wireless communicating device and the at least one second mmWave wireless communicating device and the another mmWave wireless communicating device according to a separate single field in a MAC/PHY protocol for each device.

11. The system of claim 10, the beamforming device being configured to determine a number of separate beamformed links that are established between the first mmWave wireless communicating device and the least one second mmWave wireless communicating device based on information provided in separate fields in a MAC/PHY protocol for at least one of the first mmWave wireless communicating device and the at least one second mmWave wireless communicating device.

12. The system of claim 11, wherein the separate fields further indicate a maximum number of beamformed transmission links and a maximum number of beamformed reception links that the at least one of the first mmWave wireless communicating device and the at least one second mmWave wireless communicating device supports.

13. The system of claim 10, further comprising an antenna element allocation device in at least one of the first mmWave wireless communicating device and the at least one second mmWave wireless communicating device that assigns a number of antenna elements available in the at least one of the first mmWave wireless communicating device and the at least one second mmWave wireless communicating device to each of the multiple separate beamformed links between the first mmWave wireless communicating device and the at least one mmWave wireless communicating device.

14. The system of claim 13, an antenna allocating device being in the first mmWave wireless communicating device and being configured to assign the number of antenna elements available in the first mmWave wireless communicating device to each of a plurality of second mmWave wireless communicating devices based on a number of second mmWave wireless communicating devices on an equal basis.

15. The system of claim 13, an antenna allocation device being configured assign the number of antenna elements available in the at least one of the first mmWave wireless communicating device and the at least one second mmWave wireless communicating device to each of the multiple separate beamformed links between the first mmWave wireless communicating device and the at least one second mmWave wireless communicating device based on a requirement that communications between the first mmWave wireless communicating device and the at least one second mmWave wireless communicating device exceed a predetermined S(I)NR.

16. The system of claim 13, an antenna allocation device being configured to assign the number of antenna elements available in the at least one of the first mmWave wireless communicating device and the at least one second mmWave wireless communicating device to each of the multiple separate beamformed links between the first mmWave wireless communicating device and the at least one second mmWave wireless communicating device based on a requirement that communications between the first mmWave wireless communicating device and the at least one second mmWave wireless communicating device exceed a predetermined Quality of Service.

17. A non-transitory computer-readable medium storing computer-readable instructions which, when executed by a processor, cause the processor to execute a method for executing wireless communications, comprising:
   determining if a pair of mmWave wireless communicating devices are implementing a MIMO scheme between said pair of mmWave wireless communicating devices;
   establishing multiple separate beamformed links between the pair of mmWave wireless communicating devices; and
   implementing the MIMO scheme between the pair of mmWave wireless communicating devices;
   wherein the processor determines if the pair of mmWave wireless communicating devices are implementing the MIMO scheme between said pair of mmWave wireless communicating devices based on information provided by each one of the pair of mmWave wireless communicating devices;
   wherein the information provided by each one of the pair of mmWave wireless communicating devices being a separate field in a MAC/PHY protocol for each one of the pair of mmWave wireless communicating devices.

* * * * *